July 16, 1929.　　　　F. AESCHBACH　　　　1,720,990
TILTING DEVICE FOR TROUGHS MOUNTED ON ROLLERS
FOR DOUGH KNEADING MACHINES
Filed Feb. 6, 1929　　　2 Sheets-Sheet 1
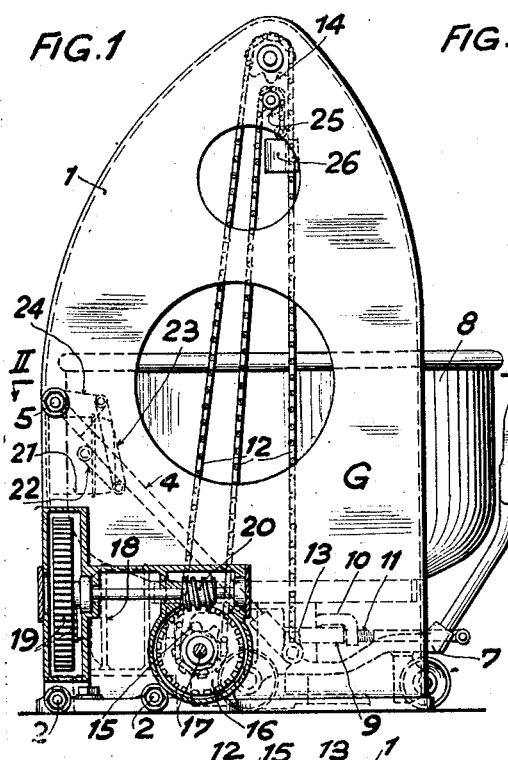
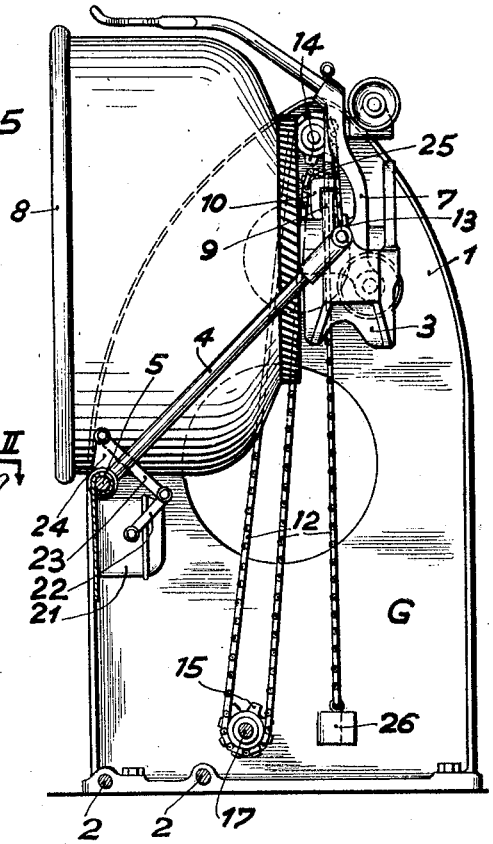
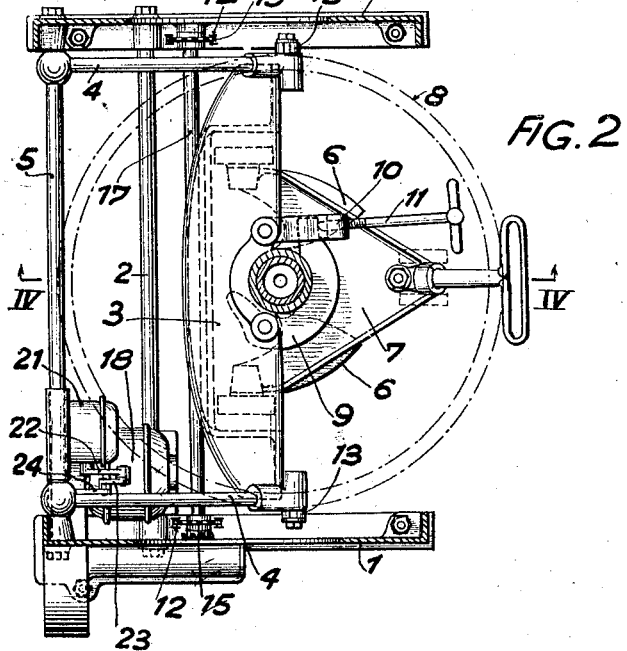
INVENTOR:
Friedrich Aeschbach,
By Henry Ortt Jr
Atty.

INVENTOR:
Friedrich Aeschbach
By Henry Orth
atty.

Patented July 16, 1929.

1,720,990

UNITED STATES PATENT OFFICE.

FRIEDRICH AESCHBACH, OF AARAU, SWITZERLAND.

TILTING DEVICE FOR TROUGHS MOUNTED ON ROLLERS FOR DOUGH-KNEADING MACHINES.

Application filed February 6, 1929, Serial No. 337,925, and in Switzerland December 10, 1928.

Dough kneading machines having a device for the tilting of the trough as an integral part of the machine as well as tilting devices fixed to the carriage of such machines are known. Besides this dough kneading machines of superseded construction exist which have a trough mounted on rollers and in which no tilting device is provided for and which do not permit of a subsequent addition of a tilting device neither to the machine proper nor to the carriage for constructional reasons or by reason that the addition of such a device would cause too extensive alterations and too great expenses.

The invention relates to a tilting device for troughs mounted on rollers for dough kneading machines which is highly qualified to be used in conjunction with dough kneading machines of the last mentioned type.

According to the invention this device consists of a frame adapted to be mounted independently of the machine in which frame a tiltable supporting member is mounted and provided with connecting means for securing the trough together with its carriage in position and which is adapted to be tilted by means of tension members attached to the same, for the purpose of tilting the trough and the carriage together with it.

In the accompanying drawings a constructional example of the subject matter of the invention is illustrated, which is intended for the tilting of a trough together with its carriage.

Figure 3:
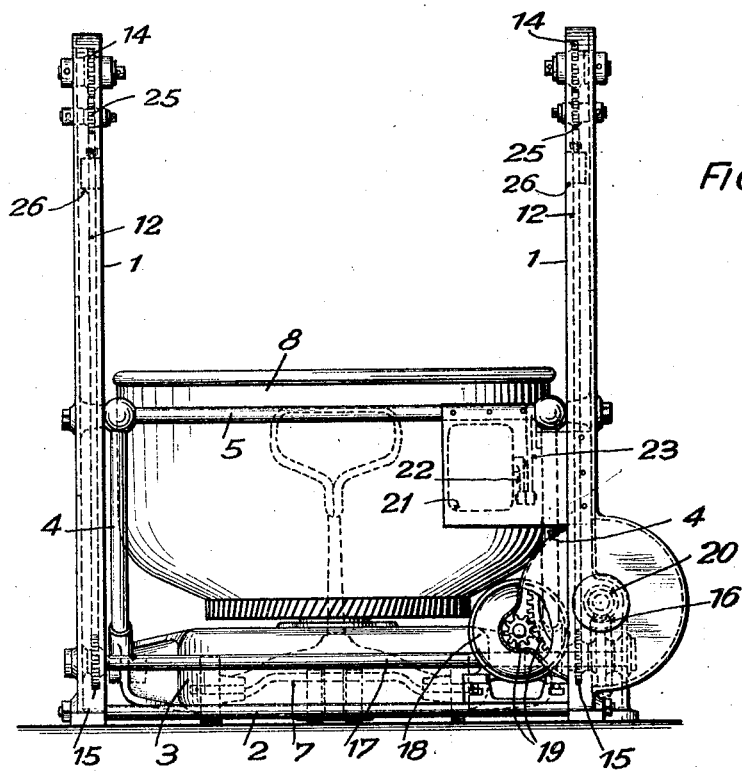
Figure 4:
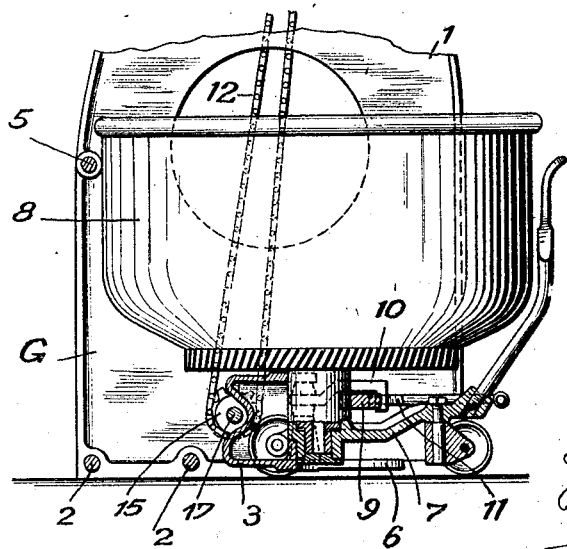

It shows:

Fig. 1 a side view of the device partly in section with the trough and carriage secured to the device, Fig. 2 is a plan view of the device with the carriage in its entered position, whereby the fastening means for the trough are made visible by omitting the upper part of the trough and wherein a section II—II through the side walls shows the construction of those means, Fig. 3 shows an elevation of the device with the trough in its entered position, Fig. 4 is a detail partly in section on line IV—IV of the body of the supporting member for the trough, Fig. 5 is a side view of the device with the trough in its raised tilted position in which the front shield of the frame is omitted.

In the device illustrated the frame consists of two lateral shields or side walls 1 rigidly interconnected by transverse bars 2. The supporting member consists of a beam shaped body 3 provided with two arms 4 turnable about the cross member 5. Two extensions 6 serve as guides when the carriage 7 together with the trough 8 enters the tilting device. Upon entering the trough is secured to the supporting member by means of the locking member 9, the lug 10 and the spindle 11 situated underneath the trough adjacent to its vertical axis. This connection is a duplicate of the connection provided in the dough kneading machine to which the trough belongs. The chains 12 are linked with their one end to projecting parts 13 of the supporting member. They pass over idle chain wheels 14 to driving wheels 15 interconnected by a shaft 17 to which also the worm wheel 16 is fixed. The worm wheel 16 is driven from an electromotor 18 through the intermediary gear drive 19 by means of the worm 20, whereby the worm drive is self locking. The limit switch 21 which is connected to one of the arms 4 of the supporting member by means of the levers 22, 23, 24, automatically interrupts the current for the motor when the tilting movement has reached its end. The free end of the chains 12 passes over an idle wheel 25 and is maintained tensioned by means of a weight 26.

This device has the great advantage that it is provided with the same connecting means as the kneading machine itself. If such a tilting device is subsequently to be added to an existing kneading machine, no alterations either thereof or of the trough and the carriage are required. After the introduction of the carriage into the device this manner of connection only permits of a perfect securing of all parts and consequently a great safety in their connection is attained.

I claim:

1. A tilting device for a trough mounted on rollers of a dough kneading machine, the combination of a frame adapted to be mounted independently of the dough kneading machine, a tiltable supporting member having its bearings in said frame, connecting means for securing the trough as well as its carriage to said supporting member, and tension members attached to the supporting member for the purpose of tilting the trough together with the carriage.

2. A tilting device for a trough mounted on rollers of a dough kneading machine, the combination of a frame adapted to be mounted independently of the dough kneading machine, a tiltable supporting member having its bearings in said frame, and having a beam shaped body, two arms supporting said body and pivotally connected to the frame, a shaft mounted in said frame around which said arms are turnable, connecting means for securing the trough as well as its carriage to said supporting member, and tension members attached to the supporting member for the purpose of tilting the trough together with the carriage.

3. A tilting device for a trough mounted on rollers of a dough kneading machine, the combination of a frame adapted to be mounted independently of the dough kneading machine, a tiltable supporting member having its bearings in said frame and having a beam shaped body, two arms supporting said body and pivotally connected to the frame, a shaft mounted in said frame around which said arms are turnable, connecting means for securing the trough as well as its carriage to said supporting member, and tension members attached to the supporting member for the purpose of tilting the trough together with the carriage, said tension members consisting of two chains connected with their one end to said arms of the supporting member, chain wheels for guiding said chains pivotally mounted in said frame, a driving wheel for each chain, a mechanical drive connected to said driving wheels for the chains, and a weight attached to the other end of said chains for maintaining the same in tensioned condition.

4. A tilting device for a trough mounted on rollers of a dough kneading machine, the combination of a frame adapted to be mounted independently of the dough kneading machine, a tiltable supporting member having its bearings in said frame, and having a beam shaped body, two arms supporting said body and pivotally connected to the frame, a shaft mounted in said frame around which said arms are turnable, connecting means for securing the trough as well as its carriage to said supporting member, and tension members attached to the supporting member for the purpose of tilting the trough together with the carriage, said tension members consisting of two chains connected with their one end to said arms of the supporting member, chain wheels for guiding said chains pivotally mounted in said frame, a driving wheel for each chain, an electromotor, a self braking worm drive interposed between said electromotor and said driving wheels for the chains, and a weight attached to the other end of said chains for maintaining the same in tensioned condition.

5. A tilting device for a trough mounted on rollers of a dough kneading machine, the combination of a frame adapted to be mounted independently of the dough kneading machine, a tiltable supporting member having its bearings in said frame, and having a beam shaped body, two arms supporting said body and pivotally connected to the frame, a shaft mounted in said frame around which said arms are turnable, connecting means for securing the trough as well as its carriage to said supporting member, and tension members attached to the supporting member for the purpose of tilting the trough together with the carriage, said tension members consisting of two chains connected with their one end to said arms of the supporting member, chain wheels for guiding said chains pivotally mounted in said frame, a driving wheel for each chain, an electromotor, a limit switch connected to said frame for automatically cutting out the electromotor when the tilting position has reached its maximum, a self braking worm drive interposed between said electromotor and said driving wheels for the chains, and a weight attached to the other end of said chains for maintaining the same in tensioned condition.

6. A tilting device for a trough mounted on rollers of a dough kneading machine, the combination of a frame adapted to be mounted independently of the dough kneading machine, a tiltable supporting member having its bearings in said frame, connecting means for securing the trough as well as its carriage to said supporting member, said connecting means being constructed in the same manner as the corresponding connecting means in the kneading machine, guiding members placed ahead of the connecting means in order to bring the trough to be entered into the device in a predetermined position with respect to the connecting means, and tension members attached to the supporting member for the purpose of tilting the trough together with the carriage.

In testimony whereof I have signed my name to this specification.

FRIEDRICH AESCHBACH.